(12) United States Patent
Kameyama et al.

(10) Patent No.: US 11,175,374 B2
(45) Date of Patent: Nov. 16, 2021

(54) LOCATION ESTIMATION APPARATUS, MOVING OBJECT, LOCATION ESTIMATION METHOD, AND COMPUTER READABLE STORAGE MEDIUM

(71) Applicant: HONDA MOTOR CO., LTD., Tokyo (JP)

(72) Inventors: Naoki Kameyama, Saitama (JP); Keiji Muro, Saitama (JP); Hideaki Shimamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/000,368

(22) Filed: Aug. 24, 2020

(65) Prior Publication Data

US 2020/0386849 A1    Dec. 10, 2020

Related U.S. Application Data

(63) Continuation of application No. PCT/JP2018/007650, filed on Feb. 28, 2018.

(51) Int. Cl.
*G01S 5/02*    (2010.01)
*A01D 34/00*    (2006.01)

(52) U.S. Cl.
CPC ...... *G01S 5/02529* (2020.05); *G01S 5/02521* (2020.05); *G01S 5/02524* (2020.05); *A01D 34/008* (2013.01)

(58) Field of Classification Search
CPC .......... G01S 19/39; G01S 19/396; G01S 5/02; G01S 5/0252; G01S 5/02521;

(Continued)

(56) References Cited

U.S. PATENT DOCUMENTS 9,250,310 B2    2/2016  Hasegawa
2006/0247890 A1    11/2006  Oguri
(Continued)

FOREIGN PATENT DOCUMENTS

JP    2006308472 A    11/2006
JP    2007256041 A    10/2007
(Continued)

OTHER PUBLICATIONS

International Preliminary Report on Patentability for International Application No. PCT/JP2018/007650, issued by the International Bureau of WIPO dated Sep. 1, 2020.
(Continued)

*Primary Examiner* — Bernarr E Gregory
*Assistant Examiner* — Fred H Mull

(57) ABSTRACT

A technology for improving a positioning precision is desired in a case where a positioning precision of a positioning signal is relatively low. A location estimation apparatus includes a sub area extraction section configured to extract one or more sub areas including at least a part of a region defined by a location and an error range indicated by positioning information, a precision parameter extraction section configured to refer to map information in which area identification information is associated with a precision parameter indicating a positioning precision and extract, with regard to each of the one or more sub areas extracted by the sub area extraction section, the precision parameter, and an output section configured to output the sub area where the positioning precision indicated by the precision parameter is equal to or worse than the positioning precision indicated by the positioning information, as a location of a moving object.

10 Claims, 9 Drawing Sheets

(58) Field of Classification Search
CPC ............. G01S 5/02524; G01S 5/02529; G01S 5/0268; A01D 34/008
See application file for complete search history.

(56) References Cited

U.S. PATENT DOCUMENTS

| | | | |
|---|---|---|---|
| 2012/0052884 A1* | 3/2012 | Bogatin | G01S 19/48 455/456.6 |
| 2014/0274031 A1* | 9/2014 | Menendez | G01S 19/48 455/426.1 |
| 2016/0278287 A1 | 9/2016 | Kasai | |

FOREIGN PATENT DOCUMENTS

| | | | |
|---|---|---|---|
| JP | 2012160988 A | 8/2012 | |
| JP | 2013223531 A | 10/2013 | |
| JP | 2016185099 A | 10/2016 | |
| JP | 2017106864 A | 6/2017 | |

OTHER PUBLICATIONS

Office Action issued for counterpart Australian Application 2018411150, issued by the Australian Patent Office dated Mar. 1, 2021.

* cited by examiner

900

| CLASSIFI-CATION | CONDITION RELATED TO THE POSITIONING PRECISION (EXAMPLE: CONDITION RELATED TO 2DRMS) | | |
| --- | --- | --- | --- |
| | AVERAGE VALUE | MAXIMUM VALUE | DEVIATION |
| a | EQUAL TO OR LOWER THAN *m | EQUAL TO OR LOWER THAN *m | EQUAL TO OR LOWER THAN *m |
| b | HIGHER THAN *m AND EQUAL TO OR LOWER THAN *m | HIGHER THAN *m AND EQUAL TO OR LOWER THAN *m | HIGHER THAN *m AND EQUAL TO OR LOWER THAN *m |
| c | HIGHER THAN *m AND EQUAL TO OR LOWER THAN *m | HIGHER THAN *m AND EQUAL TO OR LOWER THAN *m | HIGHER THAN *m AND EQUAL TO OR LOWER THAN *m |
| d | HIGHER THAN *m | HIGHER THAN *m | HIGHER THAN *m |

FIG. 9

LOCATION ESTIMATION APPARATUS, MOVING OBJECT, LOCATION ESTIMATION METHOD, AND COMPUTER READABLE STORAGE MEDIUM

The contents of the following international application are incorporated herein by reference:
NO. PCT/JP2018/007650 filed on Feb. 28, 2018.

BACKGROUND

1. Technical Field

The present invention relates to a location estimation apparatus, a moving object, a location estimation method, and a computer readable storage medium.

2. Related Art

In recent years, working machinery that estimates a self-location using a GPS signal and autonomously travels inside a predetermined region has been developed. (For example, see Patent Literature 1 or 2).

CITATION LIST

Patent Literature

[Patent Literature 1] Japanese Unexamined Patent Application Publication No. 2016-185099
[Patent Literature 2] Japanese Unexamined Patent Application Publication No. 2013-223531

The summary clause does not necessarily describe all necessary features of the embodiments of the present invention. The present invention may also be a sub-combination of the features described above.

BRIEF DESCRIPTION OF THE DRAWINGS

FIG. 9 schematically illustrates one example of a data table 900.

DESCRIPTION OF EXEMPLARY EMBODIMENTS

Figure 1:
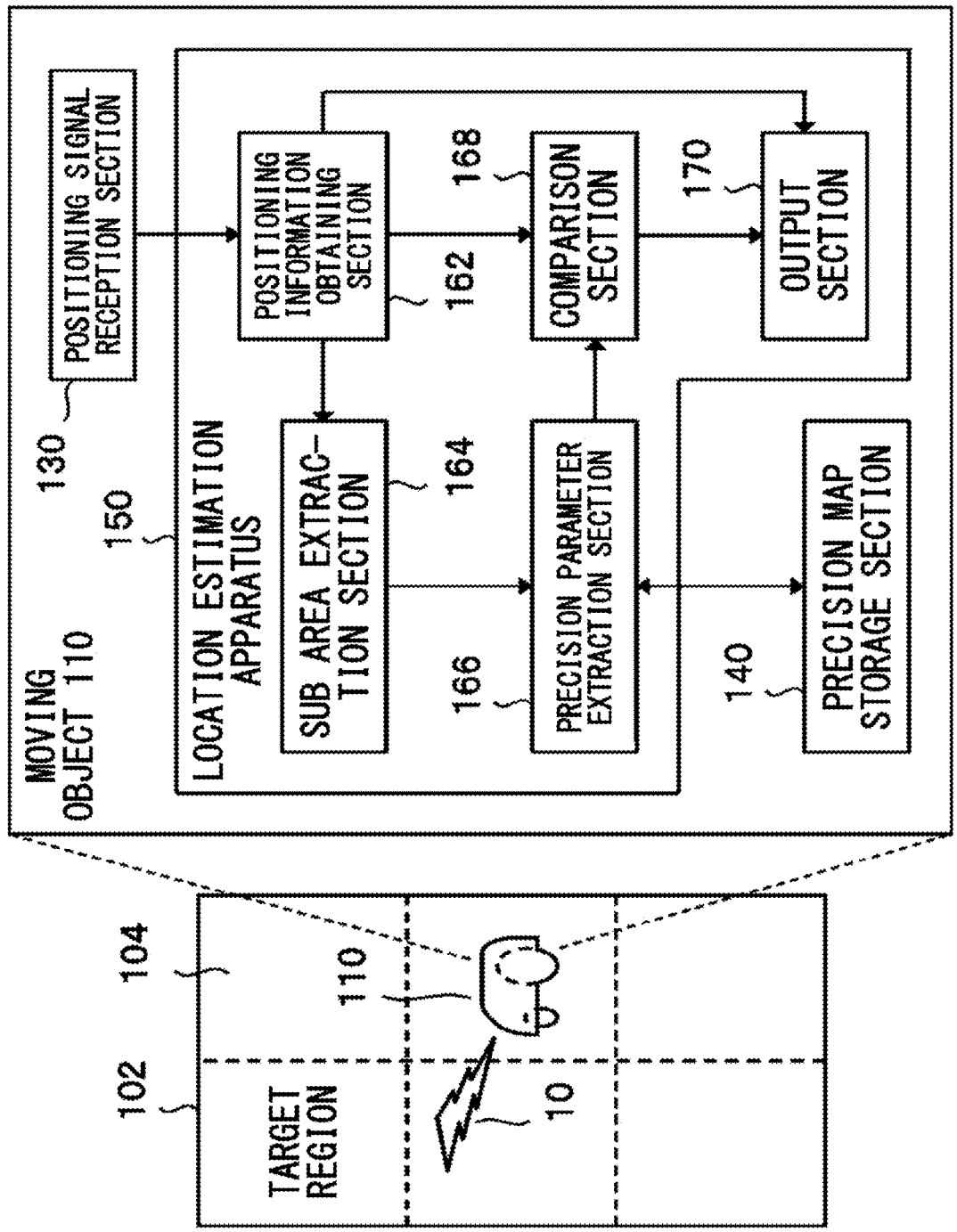
FIG. 1 schematically illustrates one example of an internal configuration of a moving object 110.

Hereinafter, the present invention will be described by way of exemplary embodiments of the invention, but the following embodiments are not intended to restrict the invention according to the claims. In addition, not all combinations of features described in the embodiments necessarily have to be essential to solving means of the invention. It is noted that in the drawings, the same or similar parts are assigned with the same reference signs, and redundant descriptions may be omitted in some cases. In addition, as long as a technically significant contradiction is not made, two or more elements that have the same name and are assigned with different reference signs may respectively have mutually similar configurations.

Outline of the Moving Object 110

FIG. 1 schematically illustrates one example of an internal configuration of a moving object 110 according to one embodiment. According to the present embodiment, the moving object 110 includes, for example, a positioning signal reception section 130. The moving object 110 may also include a precision map storage section 140. The moving object 110 may also include a location estimation apparatus 150. According to the present embodiment, the location estimation apparatus 150 includes, for example, a positioning information obtaining section 162. The location estimation apparatus 150 may also include a sub area extraction section 164. The location estimation apparatus 150 may also include a precision parameter extraction section 166. The location estimation apparatus 150 may also include a comparison section 168. The location estimation apparatus 150 may also include an output section 170.

According to the present embodiment, the moving object 110 moves inside a target region 102. The moving object 110 may also be a moving object that travels on the land, may also be a moving object that flies in the air, or may also be a moving object that navigates under the water or on the water.

A location and a range of the target region 102 are not particularly limited. The range of the region may represent a size and a shape of the region. The target region 102 may have any geographical range. The target region 102 may have a predetermined geographical range. The target region 102 may be a region set as an application target of location estimation processing using a precision parameter. The target region 102 may be a region in which the movement of the moving object 110 is permitted.

According to the present embodiment, a plurality of sub areas 104 is included inside the target region 102. Each of the sub areas 104 may also be an area which is separated by a physical geographical boundary or may also be an area which is separated by a virtual geographical boundary.

As the physical geographical boundary, (i) a boundary defined by a structure that is naturally or artificially formed, (ii) a boundary defined by sprayed chemicals, (iii) a boundary defined by an electromagnetic wave such as visible light, infrared light, ultraviolet light, and the like, (iv) a boundary defined by a magnetic field, (v) a boundary defined by an acoustic wave or an ultrasonic sound wave, and the like are exemplified. As the naturally formed structure, a dent, a step, a slope, a lake, a river, and the like are exemplified. As the artificially formed structure, a lane, a groove, a tunnel, a building, a wire, a rope, a fence, a net, a Braille block, and the like are exemplified. As the virtual geographical boundary, a geofence, a virtual wire, and the like are exemplified. The virtual wire may be a geographical boundary defined by a virtual line set between a plurality of structures.

The number of sub areas 104 included inside the target region 102 and sizes and shapes of the sub areas 104 are not particularly limited. However, the plurality of sub areas 104 is preferably uniformly arranged inside the target region 102 to avoid the absence of the arrangement and the overlapped arrangement. The respective sizes of the plurality of sub areas 104 may also be the same, or may also be different from each other. The respective shapes of the plurality of sub areas 104 may also be the same, or may also be different from each other.

The number of the sub areas 104 disposed inside the target region 102 may also be fixed, or may also be variable. For example, the number of the sub areas 104 disposed in a particular region that constitutes a part of the target region 102 is changed when occurrence of a predetermined event is used as a trigger. Specifically, a plurality of the sub areas 104 disposed adjacent to each other may also be virtually combined to form a single sub area 104. The single sub area 104 may also be virtually divided into a plurality of the sub areas 104 disposed adjacent to each other. The number of the sub areas 104 disposed in the particular region inside the target region 102 may also be adjusted according to a required precision.

Outline of Each Section of the Moving Object 110

According to the present embodiment, the positioning signal reception section 130 receives a positioning signal. The positioning signal includes information used for processing to estimate a location (which may be referred to as location estimation processing in some cases) of a spot where the positioning signal is received (which may be referred to as a positioning spot in some cases). The positioning signal may also include information used for processing to estimate an error in the location estimation processing. As the positioning signal, a GPS signal, a beacon signal, a radio signal for a wireless communication, and the like are exemplified.

According to the present embodiment, the positioning signal reception section 130 outputs positioning information. For example, the positioning signal reception section 130 transmits the positioning information to the location estimation apparatus 150. The positioning information may include location information indicating the location of the positioning spot. The positioning information may include precision information indicating a positioning precision. As a representation format of the positioning precision, RMS (root mean square), DRMS (distance root mean square), 2DRMS, CEP (circular error probable), RMSE (root mean square error), and the like are exemplified. The positioning precision may also be represented as a positioning error [m or cm].

The positioning signal reception section 130 may generate the location information and the precision information based on the positioning signal received at any positioning spot by the positioning signal reception section 130 mounted to the moving object 110. The positioning signal reception section 130 may generate the positioning information based on a plurality of positioning signals of a single type. The positioning signal reception section 130 may generate the positioning information based on a plurality of positioning signals of a plurality of types.

According to the present embodiment, the precision map storage section 140 associates and stores (i) area identification information for identifying each of the plurality of sub areas 104 and (ii) a precision parameter of the sub area 104 identified by the area identification information. The precision map storage section 140 may also store information (which may be referred to as map information in some cases) in which the area identification information for identifying each of the plurality of sub areas 104 and the precision parameter of the sub area 104 identified by the area identification information are associated with each other.

The precision parameter indicates the positioning precision in the corresponding sub area. The precision parameter may be a parameter indicating the positioning precision of the positioning using the positioning signal 10. A decision method and a format of the precision parameter are not particularly limited.

The precision parameter may also be represented by continuous numeric values or may also be represented by stepwise classifications. As the precision parameter, (i) an evaluation obtained when one or more actual measurement values related to the positioning precision in the corresponding sub area 104 or a statistic value thereof is subjected to an n-grade evaluation (n is an integer of two or higher), (ii) an evaluation obtained when one or more actual performance values related to the positioning precision in the corresponding sub area 104 or a statistic value thereof is input to an evaluation function where the positioning precision or the statistic value thereof is set as a variable, (iii) an evaluation obtained when one or more actual performance values related to the positioning precision in the corresponding sub area 104 or a statistic value thereof is input to the learning machine, and the like are exemplified.

The evaluation based on the n-grade evaluation may also be an evaluation based on a single criterion, or may also be an evaluation based on a plurality of criteria. The evaluation function may also be a function in which the measurement precision or the statistic value is set as a sole independent variable, or may also be a function represented by a plurality of independent variables including the measurement precision or the statistic value thereof. The learning machine may also be a learning model obtained by supervised learning, or may also be a learning model obtained by unsupervised learning. The evaluation may also be represented by a symbol or a character, or may also be represented by a numeral.

The precision map storage section 140 may also associate and store (i) the area identification information for identifying each of a plurality of sub areas 104, and (ii) the precision parameters of the plurality of types related to the sub area 104 identified by the area identification information. Each of the precision parameters of the plurality of types may be a precision parameter in accordance with (i) a reception performance of a receiver that has received the positioning signal, (ii) a meteorological condition when the positioning signal has been received, (iii) the number of positioning signals used for the positioning, or the like.

The precision map storage section 140 may associate and store (i) the area identification information for identifying each of a plurality of sub areas 104, (ii) the precision parameter of the sub area 104 identified by the area identification information, and (iii) an algorithm that has calculated the precision parameter or the identification information thereof. The precision map storage section 140 may associate and store (i) the area identification information for identifying each of a plurality of sub areas 104, (ii) the precision parameters of the plurality of types related to the sub area 104 identified by the area identification information, and (iii) the algorithm that has calculated each of the precision parameters of the plurality of types or the identification information thereof. As the algorithm, the above-described n-grade evaluation, the evaluation function, the learning machine, and the like are exemplified.

According to one embodiment, the precision map storage section 140 stores the map information related to all of the sub areas 104 included in the target region 102. According to another embodiment, the precision map storage section 140 stores the map information related to a part of the sub areas 104. For example, in accordance with the location of the moving object 110, the map information stored in the precision map storage section 140 is updated. The precision map storage section 140 may access an external information processing apparatus via a communication network, and obtain the map information of the surrounding of the current location of the moving object 110. Thus, a calculation speed of the location estimation processing in the location estimation apparatus 150 is improved. At least one of a size and a shape of the region where the map information is stored in the precision map storage section 140 may also be predetermined, may also be decided based on the location of the positioning spot, or may also be decided based on the positioning precision.

According to the present embodiment, the location estimation apparatus 150 receives the positioning information output by the positioning signal reception section 130 as an input, and outputs information indicating an estimated location of the positioning spot. For example, in a case where the positioning precision indicated by the positioning information output by the positioning signal reception section 130 satisfies a predetermined first condition, the location estimation apparatus 150 executes the location estimation processing using the precision parameter, and outputs an execution result of the processing as the location of the positioning spot. On the other hand, in a case where the positioning precision indicated by the positioning information output by the positioning signal reception section 130 does not satisfy the above-described first condition, the location estimation apparatus 150 outputs a region defined by a location and an error range indicated by the positioning information that is output by the positioning signal reception section 130 as the location of the positioning spot.

As the first condition, (i) a condition where the above-described positioning precision is lower than a predetermined threshold, (ii) a condition where the above-described positioning precision is equal to or lower than the predetermined threshold, (iii) a condition where the above-described positioning precision is equal to or higher than the predetermined threshold, (iv) a condition where the above-described positioning precision is higher than the predetermined threshold, (v) a condition where the above-described positioning precision is within a predetermined numeric value range, (vi) a condition where the above-described positioning precision is out of a predetermined numeric value range, (vii) a condition where the evaluation of the above-described positioning precision is equal to or better than a predetermined evaluation, (viii) a condition where the evaluation of the above-described positioning precision is better than the predetermined evaluation, (ix) a condition where the evaluation of the above-described positioning precision is equal to or worse than the predetermined evaluation, (x) a condition where the evaluation of the above-described positioning precision is worse than the predetermined evaluation, and the like are exemplified. The positioning precision may be evaluated by a technique similar to the precision parameter. The positioning precision may also be evaluated by the same technique as the precision parameter stored in the precision map storage section 140.

The first condition may be (i) the condition where the evaluation of the above-described positioning precision is equal to or worse than the predetermined evaluation, or (ii) the condition where the evaluation of the above-described positioning precision is worse than the predetermined evaluation. In a case where the positioning precision is worse as the value of the positioning precision is higher, the first condition may be (i) the condition where the above-described positioning precision is equal to or higher than the predetermined threshold, or (ii) the condition where the above-described positioning precision is higher than the predetermined threshold. In a case where the positioning precision is worse as the value of the positioning precision is lower, the first condition may be (i) the condition where the above-described positioning precision is lower than the predetermined threshold, or (ii) the condition where the above-described positioning precision is equal to or lower than the predetermined threshold.

According to the present embodiment, a detail of the location estimation apparatus 150 will be described while a case where the location estimation apparatus 150 is disposed in the moving object 110 is used as an example. However, the location estimation apparatus 150 is not limited to the present embodiment. According to another embodiment, at least a part of elements of the location estimation apparatus 150 may also be disposed in an external information processing apparatus that can transmit or receive information with the moving object 110 via the communication network. In addition, at least a part of functions of the location estimation apparatus 150 may also be realized by the above-described external information processing apparatus.

According to the present embodiment, the positioning information obtaining section 162 obtains the positioning information from the positioning signal reception section 130. The positioning information may include the precision information indicating the positioning precision. The positioning information may also include the location information indicating the location of the positioning spot. According to the present embodiment, the positioning information obtaining section 162 transmits the above-described positioning information to at least one of the sub area extraction section 164 and the output section 170. The positioning information obtaining section 162 may also transmit the above-described positioning information to the comparison section 168.

According to one embodiment, in a case where the positioning precision indicated by the precision information included in the positioning information satisfies the first condition, the positioning information obtaining section 162 transmits the above-described positioning information to the sub area extraction section 164. The positioning information obtaining section 162 may also transmit the location information and the precision information included in the positioning information to the sub area extraction section 164. In this case, the positioning information obtaining section 162 may also transmit the above-described positioning information to the comparison section 168. The positioning information obtaining section 162 may also transmit the precision information included in the positioning information to the comparison section 168. On the other hand, in a case where the positioning precision indicated by the precision information included in the positioning information does not satisfy the first condition, the positioning information obtaining section 162 transmits the above-described positioning information to the output section 170. The positioning information obtaining section 162 may also transmit the location information and the precision information included in the positioning information to the output section 170.

According to another embodiment, the positioning information obtaining section 162 transmits the above-described positioning information to the sub area extraction section 164. The positioning information obtaining section 162 may transmit the location information and the precision information included in the positioning information to the sub area extraction section 164. In this case, the comparison section 168 may obtain the location information and the precision information included in the positioning information via the sub area extraction section 164 and the precision parameter extraction section 166. The output section 170 may obtain the location information and the precision information included in the positioning information via the sub area extraction section 164, the precision parameter extraction section 166, and the comparison section 168.

According to the present embodiment, in a case where the positioning precision indicated by the precision information included in the positioning information satisfies the first condition, the sub area extraction section 164 extracts one or more of the sub areas 104 including at least a part of the region indicated by the positioning information obtained by the positioning information obtaining section 162 among the plurality of sub areas 104 included in the target region 102. A location and a range of the region indicated by the positioning information obtained by the positioning information obtaining section 162 may be defined by the location and the error range indicated by the positioning information. The error range may be calculated based on the positioning precision indicated by the precision information included in the above-described positioning information. The sub area extraction section 164 may transmit the identification information of the extracted sub area 104 to the precision parameter extraction section 166.

The sub area extraction section 164 may extract one or more sub areas satisfying a predetermined second condition among the above-described plurality of sub areas 104. As the second condition, (i) a condition where the whole of the sub area 104 set as a determination target is included in the region indicated by the above-described positioning information, (ii) a condition where a particular location inside the sub area 104 set as the determination target (for example, a center, a center of gravity, or a representative point) is included in the region indicated by the above-described positioning information, (iii) a condition where a ratio of the area of a part included in the region indicated by the above-described positioning information to the area of the sub area set as the determination target is higher than a predetermined threshold, (iv) a condition where the ratio of the area of the part included in the region indicated by the above-described positioning information to the area of the sub area set as the determination target is equal to or higher than the predetermined threshold, and the like are exemplified.

According to the present embodiment, the precision parameter extraction section 166 refers to the map information, and with regard to each of one or more of the sub areas 104 extracted by the sub area extraction section 164, extracts the precision parameter associated with the area identification information of each sub area. For example, the precision parameter extraction section 166 refers to the precision map storage section 140 by using the area identification information of any of the sub areas 104 as a key to extract the precision parameter of the sub area 104 identified by the area identification information. The precision parameter extraction section 166 may transmit the precision parameter of each of one or more of the sub areas 104 to the comparison section 168.

According to the present embodiment, with regard to each of one or more of the sub areas 104 extracted by the sub area extraction section 164, the comparison section 168 compares the positioning precision indicated by the precision parameter that is extracted by the precision parameter extraction section 166 with the positioning precision indicated by the precision information included in the positioning information that is obtained by the positioning information obtaining section 162. The comparison section 168 may transmit a comparison result to the output section 170.

A comparison method and a representation method for the comparison result are not particularly limited. For example, the comparison section 168 outputs information indicating whether the positioning precision indicated by the above-described precision information is equal to the positioning precision indicated by the above-described precision parameter as the comparison result. The comparison section 168 may determine whether the positioning precision indicated by the above-described precision information is equal to the positioning precision indicated by the above-described precision parameter by evaluating the positioning precision indicated by the precision information using a similar algorithm to the precision parameter.

Similarly, the comparison section 168 may also output information indicating whether the positioning precision indicated by the above-described precision information is worse than the positioning precision indicated by the above-described precision parameter as the comparison result. The comparison section 168 may also output information indicating whether the positioning precision indicated by the above-described precision information is better than the positioning precision indicated by the above-described precision parameter as the comparison result.

According to one embodiment, as the comparison result, the comparison section 168 outputs (i) information indicating that the positioning precision indicated by the above-described precision information is equal to or worse than the positioning precision indicated by the above-described precision parameter, or (ii) information indicating that the positioning precision indicated by the above-described precision information is better than the positioning precision indicated by the above-described precision parameter. According to another embodiment, as the comparison result, the comparison section 168 outputs (i) information indicating that the positioning precision indicated by the above-described precision information is equal to the positioning precision indicated by the above-described precision parameter, (ii) information indicating that the positioning precision indicated by the above-described precision information is worse than the positioning precision indicated by the above-described precision parameter or (iii) information indicating that the positioning precision indicated by the above-described precision information is better than the positioning precision indicated by the above-described precision parameter.

According to the present embodiment, the output section 170 outputs the location of the positioning spot. As the location of the positioning spot, the location of the moving object 110 is exemplified. In a case where the positioning precision indicated by the positioning information output by the positioning signal reception section 130 satisfies the first condition, the output section 170 may output the location of the positioning spot based on the comparison result of the comparison section 168.

According to one embodiment, based on the comparison result of the comparison section 168, the output section 170 outputs, as the location of the positioning spot, the sub area in which the positioning precision indicated by the precision parameter extracted by the precision parameter extraction section 166 among one or more of the sub areas 104 extracted by the sub area extraction section 164 is equal to or worse than the positioning precision indicated by the precision information included in the positioning information that is obtained by the positioning information obtaining section 162. According to another embodiment, based on the comparison result of the comparison section 168, the output section 170 outputs, as the location of the positioning spot, the sub area in which the positioning precision indicated by the precision parameter extracted by the precision parameter extraction section 166 among one or more of the sub areas 104 extracted by the sub area extraction section 164 is equal to the positioning precision indicated by the precision information included in the positioning information that is obtained by the positioning information obtaining section 162.

On the other hand, in a case where the positioning precision indicated by the positioning information output by the positioning signal reception section 130 does not satisfy the first condition, the output section 170 may output, as the location of the positioning spot, the region indicated by the positioning information output by the positioning signal reception section 130. As described above, the location and the range of the region indicated by the positioning information obtained by the positioning information obtaining section 162 may be defined by the location and the error range indicated by the positioning information.

In accordance with the present embodiment, for example, in the location where the precision of the positioning using the positioning signal is relatively satisfactory, the region indicated by the positioning signal is output as the location of the positioning spot. On the other hand, in the location where the precision of the positioning using the positioning signal is relatively unsatisfactory, a range narrower than the region indicated by the positioning signal is output as the location of the positioning spot. Thus, in a case where the positioning precision of at least the positioning signal is relatively unsatisfactory, the location estimation apparatus 150 can improve the positioning precision. In a case where the positioning precision of the positioning signal is relatively satisfactory too, the location estimation apparatus 150 may further improve the positioning precision by a procedure similar to a case where the positioning precision of the positioning signal is relatively unsatisfactory.

[Specific Configuration of Each Portion of the Moving Object 110]

Each portion of the moving object 110 may also be realized by hardware, may also be realized by software, or may also be realized by hardware and software. In a case where at least a part of components constituting the moving object 110 is realized by software, the component realized by the software may be realized by activating a program that regulates the operation related to the component in an information processing apparatus having a general configuration.

The above-described information processing apparatus may include (i) a data processing device having processors such as a CPU or a GPU, a ROM, a RAM, a communication interface, and the like, (ii) input devices such as a keyboard, a touch panel, a camera, a microphone, various types of sensors, and a GPS receiver, (iii) output devices such as a display device, a speaker, and a vibration device, and (iv) storage devices (including external storage devices) such as a memory and a HDD. In the above-described information processing apparatus, the above-described data processing device or storage device may store the above-described program. The above-described program causes the information processing apparatus described above to perform the operations regulated by this program, by being executed by the processor. The above-described program may also be stored in a non-transitory computer readable recording medium.

The above-described program may be a program that causes a computer to function as the location estimation apparatus 150. The above-described computer (i) may also be a computer mounted to the moving object 110, or (ii) may also be an external computer of the moving object 110 corresponding to a computer that controls the moving object 110 via the communication network.

The above-described program may also be a program that causes a computer to execute one or a plurality of procedures related to various types of information processing in the location estimation apparatus 150. One or a plurality of procedures related to various types of information processing in the location estimation apparatus 150 may include a positioning information obtaining step to obtain the positioning information including the precision information indicating the positioning precision from the positioning signal reception section mounted to the moving object and configured to receive the positioning signal.

The above-described procedure may include a sub area extraction step to extract, in a case where the positioning precision indicated by the precision information included in the positioning information that is obtained in the positioning information obtaining step satisfies the predetermined condition, one or more sub areas including at least a part of the region defined by the location and the error range indicated by the positioning information that is obtained in the positioning information obtaining step among the plurality of sub areas included in the target region having the predetermined geographical range. The above-described procedure may include a precision parameter extraction step to refer to the map information in which the area identification information for identifying each of the plurality of sub areas is associated with the precision parameter indicating the positioning precision of the positioning using the positioning signal in the sub area, and extract the precision parameter associated with the area identification information of each sub area with regard to each of one or more sub areas extracted in the sub area extraction step.

The above-described procedure may include a comparison step to compare, with regard to each of one or more sub areas extracted in the sub area extraction step, the positioning precision indicated by the precision parameter that is extracted in the precision parameter extraction step with the positioning precision indicated by the precision information included in the positioning information that is obtained in the positioning information obtaining step. The above-described procedure may include an output step to output, as the location of the moving object, the sub area in which the positioning precision indicated by the precision parameter extracted in the precision parameter extraction step is equal to or worse than the positioning precision indicated by the precision information included in the positioning information that is obtained in the positioning information obtaining step based on the comparison result in the comparison step among one or more sub areas extracted in the sub area extraction step.

[Outline of the Management System 200]

Figure 2:
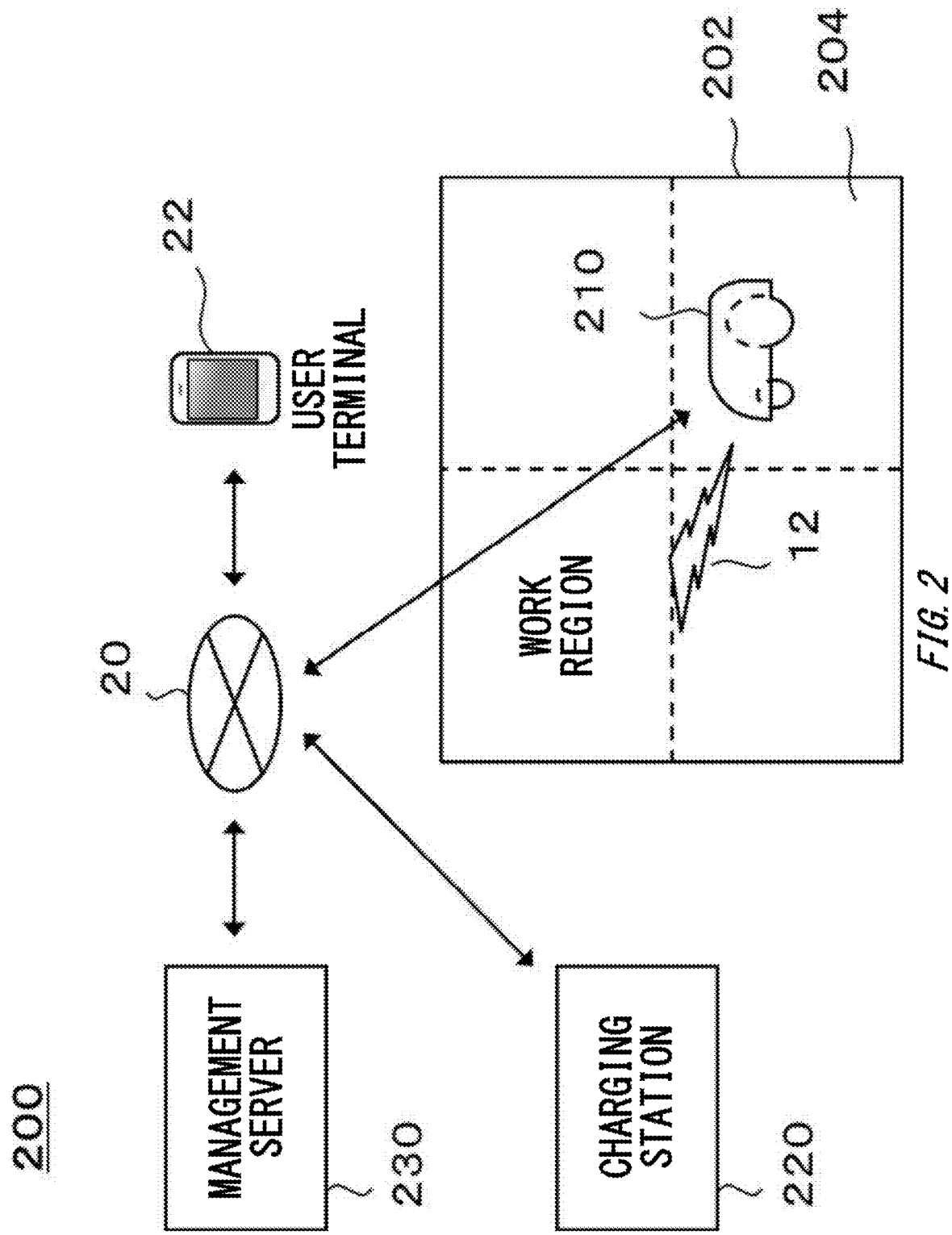
FIG. 2 schematically illustrates one example of a system configuration of a management system 200.

FIG. 2 schematically illustrates one example of a system configuration of a management system 200. According to the present embodiment, the management system 200 includes a lawn mower 210, a charging station 220, and a management server 230. The management system 200 may also include a user terminal 22.

According to the present embodiment, for the sake of simplicity of descriptions, a detail of the management system 200 will be described by using a case where the lawn mower 210 moving inside a work region 202 (i) receives the GPS signal 12, and (ii) estimates the current location of the lawn mower 210 as an example. However, the management system 200 is not limited to the present embodiment. According to another embodiment, at least one of the user terminal 22, the charging station 220, and the management server 230 may estimate the current location of the lawn mower 210 based on the GPS signal received by the lawn mower 210.

The GPS signal 12 may be one example of the positioning signal. The work region 202 may be one example of the target region. The lawn mower 210 may be one example of the moving object. The lawn mower 210 may be one example of the location estimation apparatus. The user terminal 22 may be one example of the location estimation apparatus. The charging station 220 may be one example of the location estimation apparatus. The management server 230 may be one example of the location estimation apparatus.

Each portion of the management system 200 may also mutually transmit and receive information. For example, the lawn mower 210 transmits and receives the information with at least one of the user terminal 22 and the management server 230 via a communication network 20. In a case where the charging station 220 is connected to the communication network 20, the lawn mower 210 may also transmit and receive information with at least one of the user terminal 22 and the management server 230 via the charging station 220.

According to the present embodiment, the communication network 20 may also be a wired communication transmission path, may also be a wireless communication transmission path, or may also be a combination of a wireless communication transmission path and a wired communication transmission path. The communication network 20 may also include a wireless packet communication network, the Internet, a P2P network, a dedicated line, a VPN, a power line communication link, and the like. The communication network 20 may also include (i) a mobile communication network such as a mobile phone line network, or may also include (ii) a wireless communication network such as a wireless MAN (for example, WiMAX (registered trademark)), a wireless LAN (for example, WiFi (registered trademark)), Bluetooth (registered trademark), Zigbee (registered trademark), or NFC (Near Field Communication).

According to the present embodiment, the user terminal 22 is a communication terminal used by a user of the management system 200 or the lawn mower 210, and a detail thereof is not particularly limited. As the user terminal 22, a personal computer, a mobile terminal, and the like are exemplified. As the mobile terminal, a mobile phone, a smartphone, a PDA, a tablet, a notebook computer, a laptop computer, a wearable computer, and the like are exemplified.

According to the present embodiment, the management system 200 manages the work region 202. The work region 202 may be a region where the entry of the lawn mower 210 is permitted. The work region 202 may have any geographical range. The work region 202 may have a predetermined geographical range.

The work region 202 may be a region set as an application target of the location estimation processing using the precision parameter. For example, in a region of at least a part of the work region 202, the positioning precision in each location inside the above-described region is already known. In a region of at least a part of the work region 202, the precision parameter in each location inside the above-described region may also be already obtained.

According to the present embodiment, a plurality of sub areas 204 is included inside the work region 202. Each of the sub areas 204 may also be an area which is separated by a physical geographical boundary or may also be an area which is separated by a virtual geographical boundary. According to one embodiment, with regard to all of the sub areas 204 included in the work region 202, the precision parameter of the sub area is obtained. According to another embodiment, with regard to a part of the sub areas 204 among the sub areas 204 included in the work region 202, the precision parameter of the sub area is obtained.

According to the present embodiment, the management system 200 manages a state of the work region 202. The management system 200 may also manage a state of an object (which may be referred to as a work target in some cases) on which a work is to be performed in the work region 202. The management system 200 may also manage the work performed in the work region 202. For example, the management system 200 manages a schedule of the work. The schedule of the work may be information that defines at least one of a time when the work is performed, a location where the work is performed, an entity which performs the work, the work target, and contents of the work.

According to the present embodiment, the management system 200 manages the lawn mower 210. The lawn mower 210 may be one example of the entity which performs the work. For example, the management system 200 manages a state of the lawn mower 210. For example, the management system 200 manages the location, the progress direction, the progress speed, and the energy remaining amount (for example, the remaining amount of a battery) of the lawn mower 210, the schedule of the work performed by the lawn mower 210, and the like.

It is noted that according to the present embodiment, for the sake of simplicity of descriptions, the detail of the management system 200 will be described by using an embodiment where the management system 200 manages the lawn mower 210 as an example. However, the management system 200 is not limited to the present embodiment. According to another embodiment, the management system 200 may also manage working machinery other than the lawn mower 210. The working machinery may perform various works. As the type of the work, (i) civil engineering work, (ii) construction work, (iii) cultivation work for plant or agricultural product, (iv) snow clearing work, (v) cleaning work, (vi) transport work, (vii) monitoring, guard duty, or security work, and the like are exemplified. As the cultivation work, sowing, pruning, lawn mowing, grass cutting, watering, fertilizing, soiling, weeding, and the like are exemplified. The working machinery may have an autonomous movement function. The working machinery may be one example of the moving object.

[Outline of Each Section of the Management System 200]

According to the present embodiment, the work region 202 may have a configuration similar to the target region 102 as long as a technical contradiction is not made. Similarly, the target region 102 may have a configuration similar to the work region 202 as long as a technical contradiction is not made. A sub area 204 may have a configuration similar to the sub area 104 as long as a technical contradiction is not made. Similarly, the sub area 104 may have a configuration similar to the sub area 204 as long as a technical contradiction is not made. According to the present embodiment, the lawn mower 210 may have a configuration similar to the moving object 110 as long as a technical contradiction is not made.

Similarly, the moving object 110 may have a configuration similar to the lawn mower 210 as long as a technical contradiction is not made.

According to the present embodiment, the lawn mower 210 has the autonomous movement function, and autonomously travels inside the work region 202. It is noted that the lawn mower 210 may also be moved by a remote operation by the user. The lawn mower 210 cuts the lawn growing in the work region 202. The lawn mower 210 may also travel while cutting the lawn, or may also travel without cutting the lawn. The lawn may be one example of the work target. A detail of the lawn mower 210 will be described below. According to the present embodiment, the charging station 220 charges the lawn mower 210.

According to the present embodiment, the management server 230 manages various information related to the work region 202. For example, the management server 230 manages the information in which the area identification information for identifying each of the plurality of sub areas 204 is associated with the precision parameter of the sub area 204 identified by the area identification information. The management server 230 may execute processing such as generation, update, deletion, and search of the map information.

The management server 230 may also manage the state of the work region 202 The management server 230 may also manage the state of the work target. The management server 230 may also manage the work performed in the work region 202. The management server 230 may also manage the state of the lawn mower 210. For example, the management server 230 manages the location, the progress direction, the progress speed, and the energy remaining amount of the lawn mower 210, the schedule of the work performed by the lawn mower 210, and the like. A detail of the management server 230 will be described below.

[Specific Configuration of Each Portion of the Management System 200]

Each portion of the management system 200 may also be realized by hardware, may also be realized by software, or may also be realized by hardware and software. At least a part of each portion of the management system 200 may also be realized by a single server, or may also be realized by a plurality of servers. At least a part of each portion of the management system 200 may also be realized on a virtual server or a cloud system. At least a part of each portion of the management system 200 may also be realized by a personal computer or a mobile terminal. As the mobile terminal, a mobile phone, a smartphone, a PDA, a tablet, a notebook computer, a laptop computer, a wearable computer, and the like are exemplified. The management system 200 may also store the information by using a distributed ledger technology or a distributed network such as a block chain.

In a case where at least a part of components constituting the management system 200 is realized by software, the component realized by the software may be realized by activating a program that regulates the operation related to the component in an information processing apparatus having a general configuration. The above-described information processing apparatus may include (i) a data processing device having processors such as a CPU or a GPU, a ROM, a RAM, a communication interface, and the like, (ii) input devices such as a keyboard, a touch panel, a camera, a microphone, various types of sensors, and a GPS receiver, (iii) output devices such as a display device, a speaker, and a vibration device, and (iv) storage devices (including external storage devices) such as a memory and a HDD. In the above-described information processing apparatus, the above-described data processing device or storage device may store the above-described program. The above-described program causes the information processing apparatus described above to perform the operations regulated by this program, by being executed by the processor. The above-described program may also be stored in a non-transitory computer readable recording medium.

The above-described program may also be a program that causes a computer to execute one or a plurality of procedures related to various types of information processing in the management system 200. The above-described computer may be a computer mounted to at least one of the user terminal 22, the lawn mower 210, the charging station 220, and the management server 230.

[Outline of the Lawn Mower 210]

Figure 3:
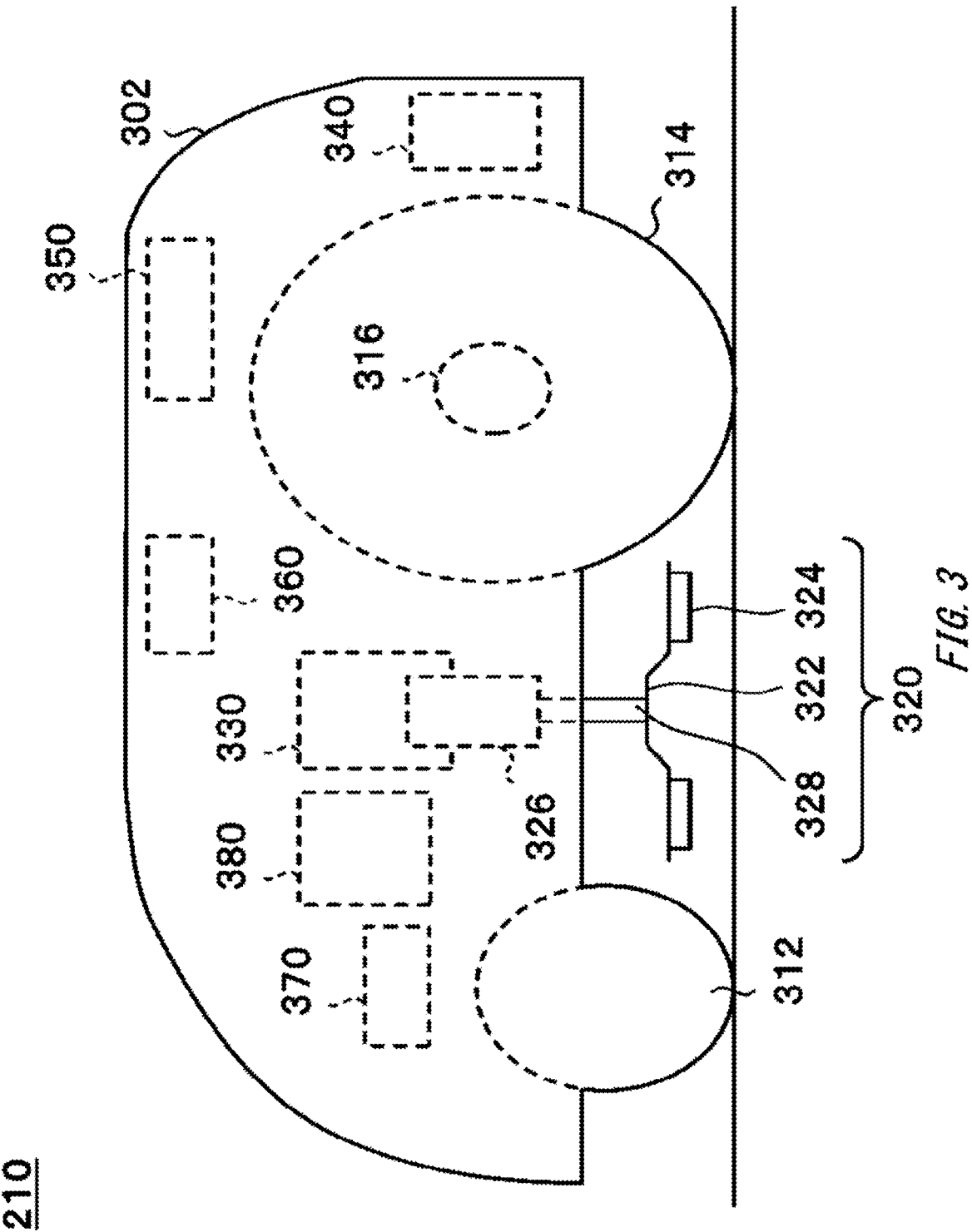
FIG. 3 schematically illustrates one example of an internal configuration of a lawn mower 210.

An outline of the lawn mower 210 will be described with reference to FIG. 3 to FIG. 6. FIG. 3 schematically illustrates one example of an internal configuration of the lawn mower 210. According to the present embodiment, the lawn mower 210 includes an enclosure 302. According to the present embodiment, the lawn mower 210 includes a pair of front wheels 312 and a pair of rear wheels 314 under the enclosure 302. The lawn mower 210 may include a pair of travel motors 316 that respectively drive a pair of rear wheels 314.

According to the present embodiment, the lawn mower 210 includes a work unit 320. The work unit 320 has, for example, a blade disk 322, a cutter blade 324, a work motor 326, and a shaft 328. The lawn mower 210 may also include a location adjustment section 330 that adjusts a location of the work unit 320.

The blade disk 322 is coupled to the work motor 326 via the shaft 328. The cutter blade 324 may be a cutting blade that cuts lawn. The cutter blade 324 is attached to the blade disk 322, and rotates together with the blade disk 322. The work motor 326 rotates the blade disk 322. The blade disk 322 and the cutter blade 324 may be one example of a cutting member for cutting the work target.

According to the present embodiment, the lawn mower 210 includes, inside the enclosure 302 or on the enclosure 302, a battery unit 340, a user interface 350, a GPS signal reception section 360, a sensor unit 370, and a control unit 380. The control unit 380 may be one example of the location estimation apparatus.

According to the present embodiment, the battery unit 340 supplies power to each portion of the lawn mower 210. According to the present embodiment, the user interface 350 accepts an input of the user. The user interface 350 outputs information to the user. As the user interface 350, a keyboard, a pointing device, a microphone, a touch panel, a display, a speaker, and the like are exemplified.

According to the present embodiment, the GPS signal reception section 360 receives the GPS signal 12. The GPS signal 12 includes information used for processing to estimate the location of the positioning spot. The GPS signal 12 may also include information used for processing to estimate the error in the location estimation processing. According to the present embodiment, the GPS signal reception section 360 outputs GPS information including the location information indicating the location of the positioning spot and the precision information indicating the positioning precision. The GPS information may be one example of the positioning information. As the representation format of the positioning precision, RMS, DRMS, 2DRMS, CEP, RMSE, and the like are exemplified. The positioning precision may also be represented as the positioning error [m or cm]. The GPS signal reception section 360 may transmit the GPS information to the control unit 380.

According to the present embodiment, the sensor unit 370 includes various sensors. The sensor unit 370 may include various internal sensors. The sensor unit 370 may include various external sensors. As the sensor, a millimeter wave sensor, a proximity detection sensor, a camera, an infrared camera, a microphone, an ultrasonic sensor, an acceleration sensor, an angular velocity sensor, a wheel speed sensor, a load sensor, an idling detection sensor, a magnetic sensor, a geomagnetic sensor (also referred to as an orientation sensor, an electronic compass, and the like in some cases), a temperature sensor, a moisture sensor, a soil moisture sensor and the like are exemplified. The sensor unit 370 may transmit outputs of various sensors to the control unit 380. The wheel speed sensor may also be a rotary encoder configured to detect a rotation angle or the number of rotations of the wheel.

According to the present embodiment, the control unit 380 controls an operation of the lawn mower 210. According to one embodiment, the control unit 380 controls the one pair of travel motors 316 to control the movement of the lawn mower 210. According to another embodiment, the control unit 380 controls the work motor 326 to control the work of the lawn mower 210.

The control unit 380 may also control the lawn mower 210 based on an instruction from the management server 230. For example, the control unit 380 controls the lawn mower 210 in accordance with the command generated by the management server 230. A detail of the control unit 380 will be described below.

Figure 4:
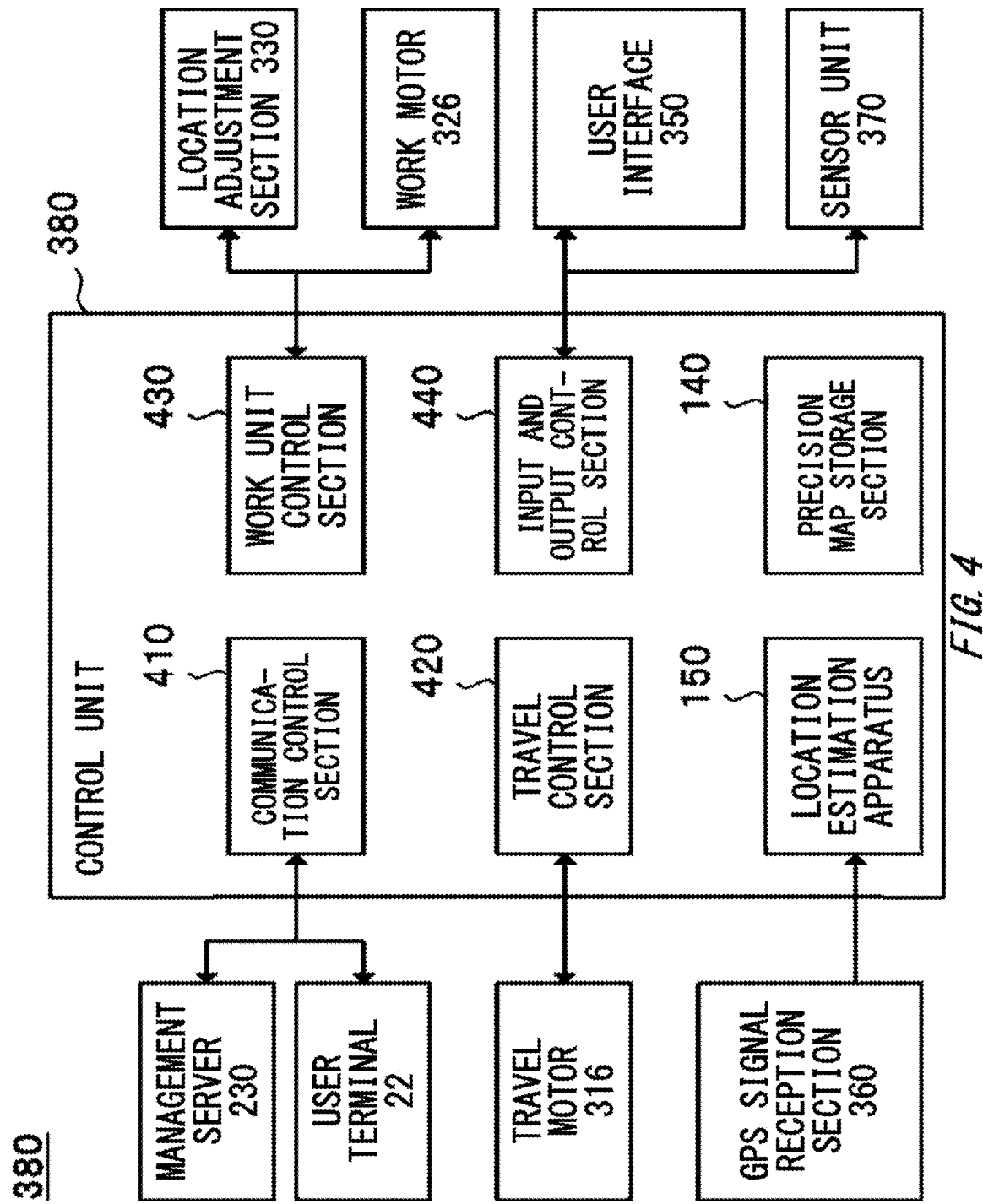
FIG. 4 schematically illustrates one example of an internal configuration of a control unit 380.

FIG. 4 schematically illustrates one example of an internal configuration of the control unit 380. According to the present embodiment, the control unit 380 includes the precision map storage section 140 and the location estimation apparatus 150. The control unit 380 may also include a communication control section 410, a travel control section 420, a work unit control section 430, and an input and output control section 440.

According to the present embodiment, the precision map storage section 140 associates and stores (i) the area identification information for identifying each of the plurality of sub areas 204, and (ii) the precision parameter of the sub area 204 identified by the area identification information. The precision map storage section 140 may also store the information in which the area identification information for identifying each of the plurality of sub areas 204 is associated with the precision parameter of the sub area 204 identified by the area identification information (which may be referred to as map information in some cases).

The precision map storage section 140 may also associate and store (i) the area identification information for identifying each of the plurality of sub areas 204, and (ii) the precision parameters of the plurality of types related to the sub area 204 identified by the area identification information. Each of the precision parameters of the plurality of types may be a precision parameter in accordance with (i) a reception performance of a receiver that has received the positioning signal, (ii) a meteorological condition when the positioning signal has been received, (iii) the number of positioning signals used for the positioning, or the like.

The precision map storage section 140 may associate and store (i) the area identification information for identifying each of the plurality of sub areas 204, (ii) the precision parameter of the sub area 204 identified by the area identification information, and (iii) the algorithm that has calculated the precision parameter or the identification information thereof. The precision map storage section 140 may associate and store (i) the area identification information for identifying each of the plurality of sub areas 204, (ii) the precision parameters of the plurality of types related to the sub area 204 identified by the area identification information, and (iii) the algorithm that has calculated each of the precision parameters of the plurality of types or the identification information thereof. As the algorithm, the above-described n-grade evaluation, the evaluation function, the learning machine, and the like are exemplified.

According to one embodiment, the precision map storage section 140 stores the map information related to all of the sub areas 204 included in the work region 202. According to another embodiment, the precision map storage section 140 stores the map information related to a part of the sub areas 204. The precision map storage section 140 may access the management server 230 via the communication control section 410, and obtain the map information of the surrounding of the current location of the lawn mower 210. At least one of the size and the shape of the region where the map information is stored in the precision map storage section 140 may also be predetermined, may also be decided based on the location of the positioning spot, or may also be decided based on the positioning precision.

According to the present embodiment, the location estimation apparatus 150 receives the GPS information output by the GPS signal reception section 360 as an input, and outputs the information indicating the estimated location of the lawn mower 210. For example, the positioning information obtaining section 162 of the location estimation apparatus 150 obtains the GPS information output by the GPS signal reception section 360. According to the present embodiment, the location estimation apparatus 150 transmits the information indicating the estimated location of the lawn mower 210, for example, to at least one of the travel control section 420 and the work unit control section 430. The location estimation apparatus 150 may also transmit the GPS information output by the GPS signal reception section 360 to the management server 230 via the communication control section 410.

According to the present embodiment, the communication control section 410 controls a communication with an external apparatus of the lawn mower 210. The communication control section 410 may also be a communication interface compatible with one or a plurality of communication methods. As the external apparatus, the user terminal 22, the charging station 220, the management server 230, and the like are exemplified.

According to the present embodiment, the travel control section 420 controls the travel motor 316 to control the movement of the lawn mower 210. The travel control section 420 controls autonomous travel of the lawn mower 210. For example, the travel control section 420 controls at least one of the movement mode of the lawn mower 210, the progress speed, the progress direction, and the movement route. The travel control section 420 may monitor a current value of the travel motor 316.

According to the present embodiment, the work unit control section 430 controls the work unit 320. The work unit control section 430 may control at least one of the work mode of the work unit 320, the type of the work, the intensity of the work, and the timing when the work is performed. For example, the work unit control section 430 controls the work motor 326 to control the intensity of the work of the work unit 320. The work unit control section 430 may also control the location adjustment section 330 to control the intensity of the work of the work unit 320. The work unit control section 430 may monitor a current value of the work motor 326.

According to the present embodiment, the input and output control section 440 receives an input from at least one of the user interface 350, the GPS signal reception section 360, and the sensor unit 370. The input and output control section 440 outputs the information to the user interface 350. The input and output control section 440 may also control at least one of the user interface 350, the GPS signal reception section 360, and the sensor unit 370.

Figure 5:
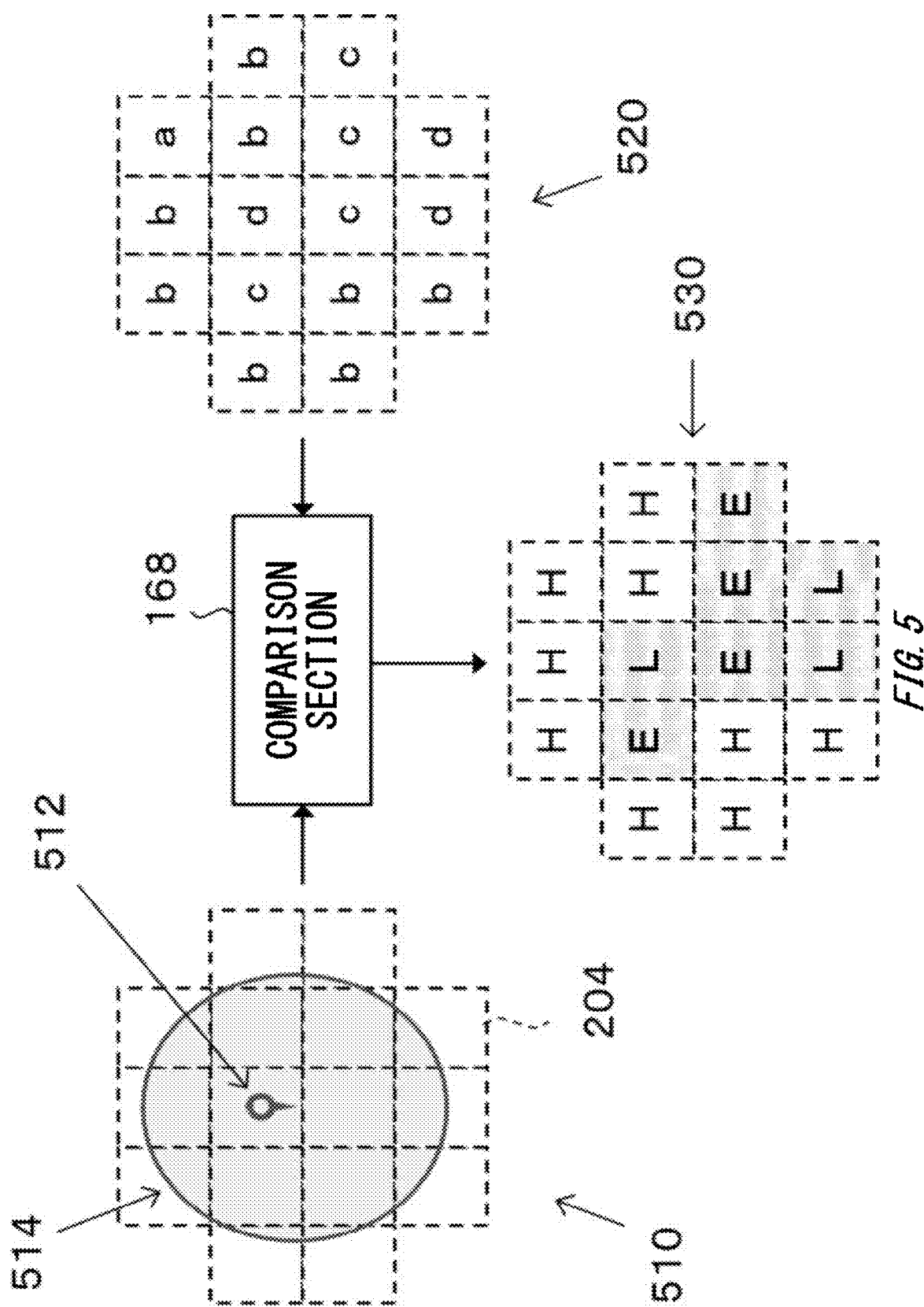
FIG. 5 schematically illustrates one example of information processing of a comparison section 168 according to one embodiment.

FIG. 5 schematically illustrates one example of information processing of the comparison section 168 according to one embodiment. According to the present embodiment, data 510 related to the positioning precision indicated by the GPS information that is output by the GPS signal reception section 360 and data 520 related to the positioning precision indicated by the precision parameter that is extracted by the precision parameter extraction section 166 are input to the comparison section 168.

The data 510 may be information indicating the positioning precision indicated by the precision information included in the GPS information, and the format is not particularly limited. According to one embodiment, the data 510 may be the GPS information. According to another embodiment, the data 510 may be the precision information included in the GPS information. According to still another embodiment, the data 510 may be data in which the identification information for identifying each sub area is associated with the information indicating the positioning precision of each sub area which is indicated by the precision information with regard to each of one or more of the sub areas 204.

In the data 510, the positioning precision in each of the sub areas may be the same. In this case, as the positioning precision of one or more of the sub areas 204, a single value indicated by the precision information is used. In the data 510, a configuration may also be adopted where the positioning precision in each of the sub areas is not the same. In this case, the positioning precision of each sub area is decided, for example, based on the positioning precision indicated by the precision information, the representation format of the positioning precision indicated by the precision information, and a distance from a location 512 of the representative point of each sub area.

The data 520 may be information indicating the positioning precision indicated by the precision parameter that is extracted by the precision parameter extraction section 166, and the format is not particularly limited. The data 520 may be data in which the identification information for identifying each sub area is associated with the information indicating the precision parameter in each sub area with regard to each of one or more of the sub areas 204.

According to the present embodiment, information processing of the location estimation apparatus 150 according to one embodiment will be described by using a case where the sub area extraction section 164 extracts one or more of the sub areas 104 including at least a part of a region 514 therein as an example. However, the information processing of the location estimation apparatus 150 according to one embodiment is not limited to the present embodiment.

According to another embodiment, the sub area extraction section 164 may also extract one or more of the sub areas 104 satisfying the above-described second condition. As the second condition, (i) a condition where the whole of the sub area set as the determination target 204 is included in the region 514, (ii) a condition where a particular location inside the sub area set as the determination target 204 (for example, the center, the center of gravity, or the representative point) is included in the region 514, (iii) a condition where a ratio of the area of the part included in the region 514 to the area of the sub area set as the determination target 204 is higher than a predetermined threshold, (iv) a condition where the ratio of the area of the part included in the region 514 to the area of the sub area set as the determination target 204 is equal to or higher than the predetermined threshold, and the like are exemplified.

According to the present embodiment, a range (for example, a size and a shape) of the region 514 indicated by the GPS information is decided by the error range that is decided based on the precision information included in the GPS information output by the GPS signal reception section 360. In addition, a location of the region 514 indicated by the GPS information is decided such that the center or the center of gravity of the region 514 is matched with the location 512 indicated by the location information that is included in the above-described GPS information.

According to the present embodiment, first, the comparison section 168 specifies the algorithm that has calculated the precision parameter which is included in the data 520. Next, the comparison section 168 evaluates the positioning precision indicated by the data 510 using the specified algorithm. Next, with regard to each of one or more of the sub areas 204, the comparison section 168 compares the evaluation related to the positioning precision indicated by the data 510 with the precision parameter indicated by the data 520.

According to the present embodiment, the comparison section 168 determines whether the evaluation result related to the positioning precision indicated by the data 510 is equal to (which is represented as "E" in the drawing), is worse than (which is represented as "L" in the drawing), or is better than (which is represented as "H" in the drawing) the precision parameter indicated by the data 520. Thereafter, the comparison section 168 outputs a comparison result 530. With regard to each of one or more of the sub areas 204, the comparison result 530 may be information in which the identification information for identifying each sub area is associated with the determination result of each sub area.

Figure 6:
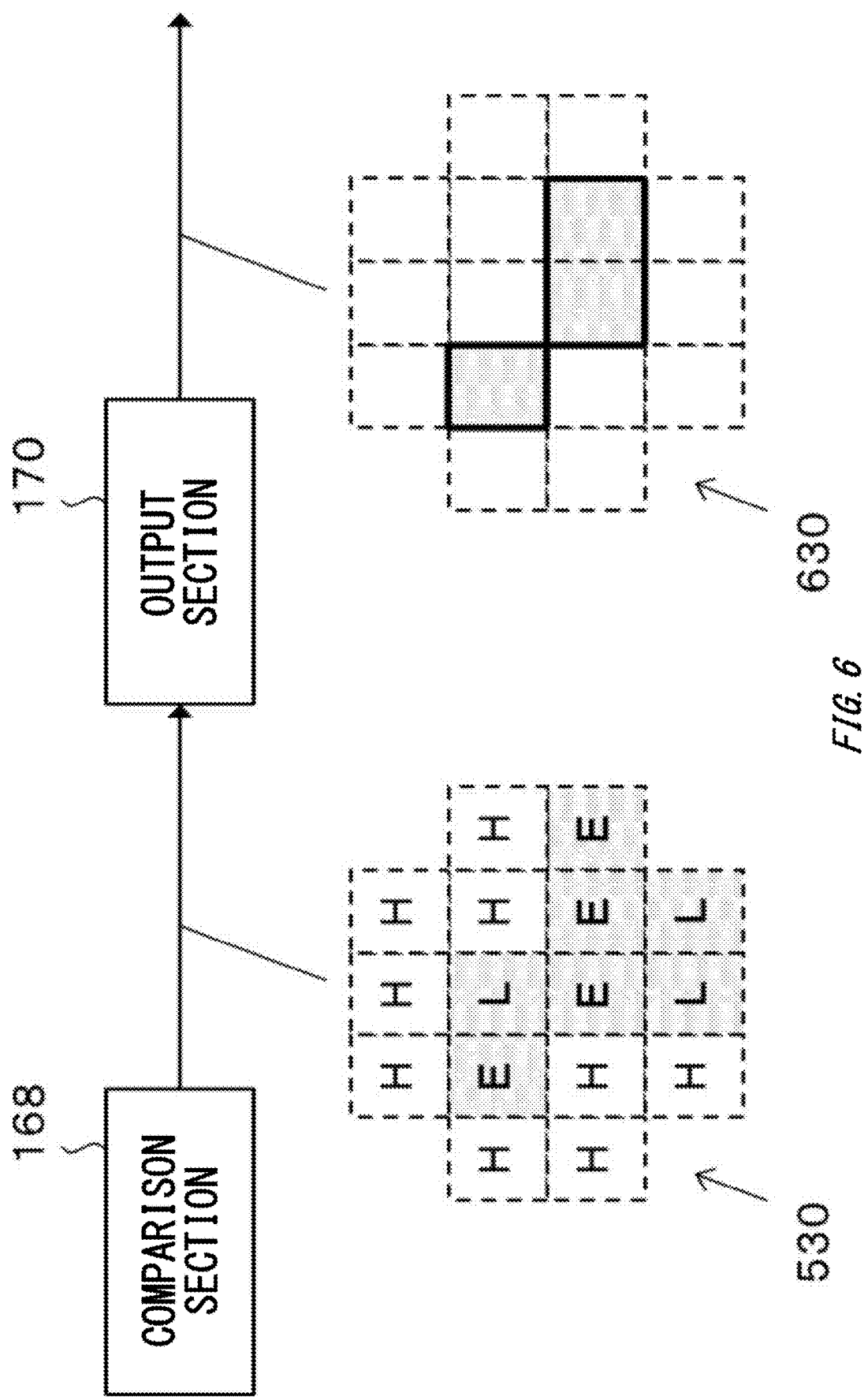
FIG. 6 schematically illustrates one example of information processing of an output section 170 according to one embodiment.

FIG. 6 schematically illustrates one example of information processing of the output section 170 according to one embodiment. According to the present embodiment, the comparison result 530 output by the comparison section 168 is input to the output section 170. The output section 170 decides one or a plurality of sub areas 204 indicating the estimated location 630 of the positioning spot based on the comparison result 530 from among one or more of the sub areas 204 extracted by the sub area extraction section 164. Thereafter, the output section 170 outputs the information indicating the estimated location 630. The information indicating the estimated location 630 may also be the identification information of one or a plurality of sub areas 204 indicating the estimated location 630, or may also be information indicating a boundary of the region indicated by the sub area 204.

In a case where the sub area extraction section 164 extracts the plurality of sub areas 204, the output section 170 may decide the sub area 204 indicating the estimated location 630 of the positioning spot such that a total value of the areas of one or a plurality of sub areas 204 selected as the estimated location 630 is smaller than the area of the region 514 indicated by the GPS information. Thus, even in a case where the positioning precision of the GPS signal 12 is relatively low, the positioning precision can be improved.

According to one embodiment, the output section 170 decides the sub area 204 where the determination result indicated by the comparison result 530 is "equal" or "worse" as the sub area 204 indicating the estimated location 630. Thus, the sub area 204 where the above-described determination result is "better" is excluded from the range indicating the estimated location 630. According to another embodiment, the output section 170 decides, as the sub area 204 indicating the estimated location 630, the sub area 204 where the determination result indicated by the comparison result 530 is "equal". The sub area 204 where the above-described determination result is "better" or "worse" is excluded from the range indicating the estimated location 630.

According to still another embodiment, the output section 170 may decide the sub area 204 where a predetermined third condition is satisfied among the sub areas 204 where the determination result indicated by the comparison result 530 is "equal" or "worse" as the sub area 204 indicating the estimated location 630. The output section 170 may decide the sub area 204 that satisfies the above-described third condition among the sub areas 204 where the determination result indicated by the comparison result 530 is "equal", as the sub area 204 indicating the estimated location 630.

As the third condition, (i) a condition where the whole of the sub area set as the determination target 204 is included in the region 514, (ii) a condition where a particular location inside the sub area set as the determination target 204 (for example, the center, the center of gravity, or the representative point) is included in the region 514, (iii) a condition where the ratio of the area of the part included in the region 514 to the area of the sub area set as the determination target 204 is higher than a predetermined threshold, (iv) a condition where the ratio of the area of the part included in the region 514 to the area of the sub area set as the determination target 204 is equal to or higher than the predetermined threshold, and the like are exemplified. The threshold in the third condition may also be the same as the threshold in the second condition, or may also be different from the threshold in the second condition.

According to still another embodiment, the output section 170 may extract the sub area 204 (the sub area 204 including a part of the region 514) which is included in the region 514 among the sub areas 204 where the determination result indicated by the comparison result 530 is "equal" or "worse". The output section 170 may further divide the extracted sub area 204 into a plurality of sub areas (may be referred to as micro areas in some cases). The output section 170 may include, in the sub area 204 indicating the estimated location 630, the micro area at least a part of which is included in the region 514 among the plurality of micro areas. Thus, a part of the micro areas is excluded from the range indicating the estimated location 630.

According to still another embodiment, the output section 170 may extract the sub area 204 included in the region 514 from among the sub areas 204 in which the determination result indicated by the comparison result 530 is "equal". The output section 170 may further divide the extracted sub area 204 into a plurality of micro areas. The output section 170 may include, in the sub area 204 indicating the estimated location 630, the sub area at least a part of which is included in the region 514 among the plurality of micro areas. Thus, a part of the micro areas is excluded from the range indicating the estimated location 630.

Figure 7:
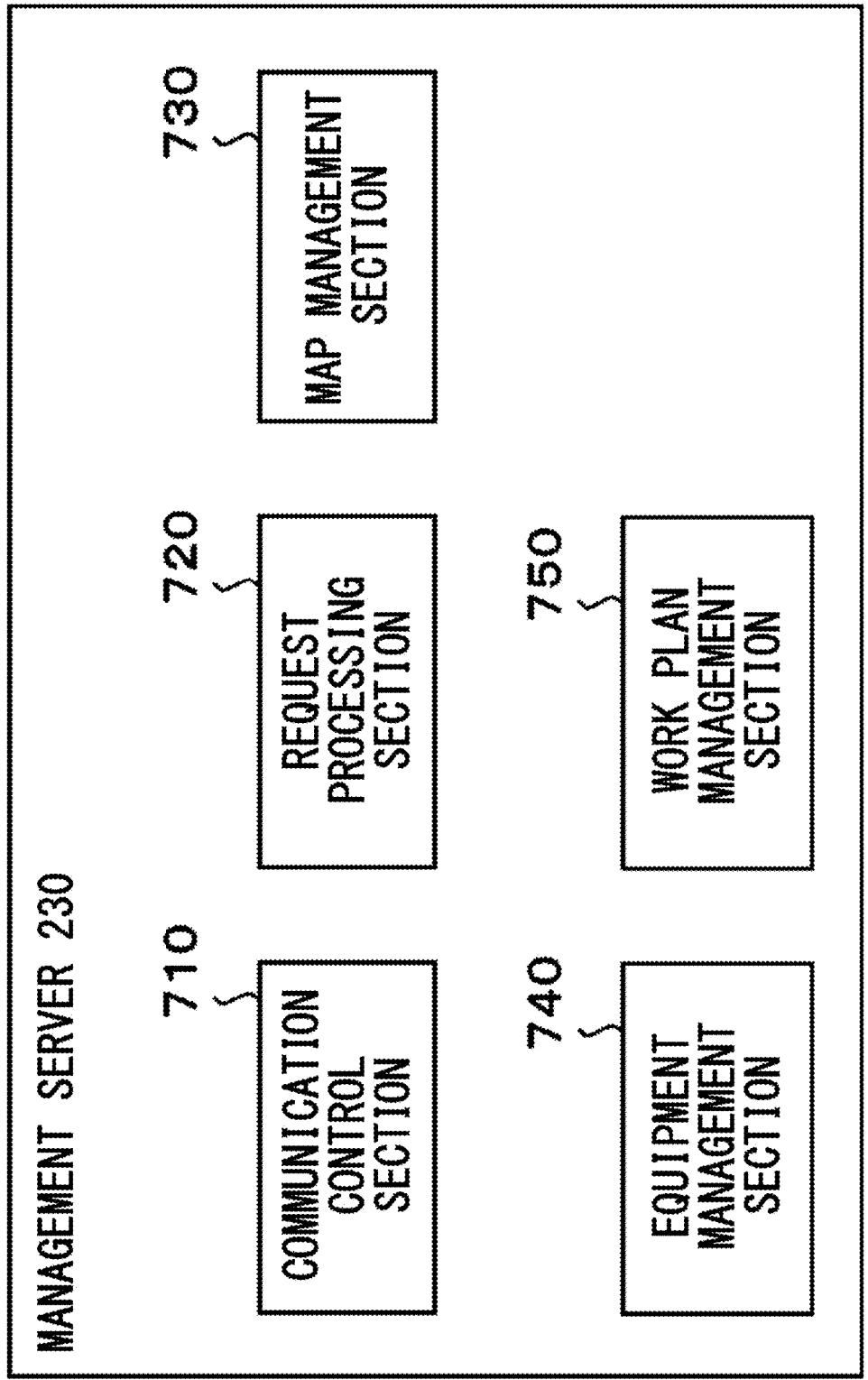
FIG. 7 schematically illustrates one example of an internal configuration of a management server 230.

FIG. 7 schematically illustrates one example of an internal configuration of the management server 230. According to the present embodiment, the management server 230 includes a communication control section 710, a request processing section 720, a map management section 730, an equipment management section 740, and a work plan management section 750.

According to the present embodiment, the communication control section 710 controls a communication with an external apparatus of the management server 230. The communication control section 710 may also be a communication interface compatible to one or a plurality of communication methods. As the external apparatus, the user terminal 22, the lawn mower 210, the charging station 220, and the like are exemplified. According to the present embodiment, the request processing section 720 accepts a request from an external apparatus. The request processing section 720 processes the request from the external apparatus.

According to the present embodiment, the map management section 730 manages the map information. According to one embodiment, the map management section 730 manages the map information of all of the sub areas 204 included in the work region 202. According to another embodiment, with regard to a part of the sub areas 204 among the sub areas 204 included in the work region 202, the map management section 730 manages the map information of the above-described sub area. A detail of the map management section 730 will be described below.

According to the present embodiment, the equipment management section 740 manages various devices constituting the management system 200. For example, the equipment management section 740 controls at least one of the lawn mower 210 and the charging station 220. The equipment management section 740 may also manage the information related to the various devices associated with the management system 200. For example, the equipment management section 740 manages information related to at least one of the lawn mower 210 and the charging station 220. The equipment management section 740 may also manages the information related to the user terminal 22.

According to the present embodiment, the work plan management section 750 manages the schedule of the work to be performed by the lawn mower 210. The work plan management section 750 may plan the work schedule of the lawn mower 210. The work plan management section 750 may manage the progress of the work schedule of the lawn mower 210.

Figure 8:
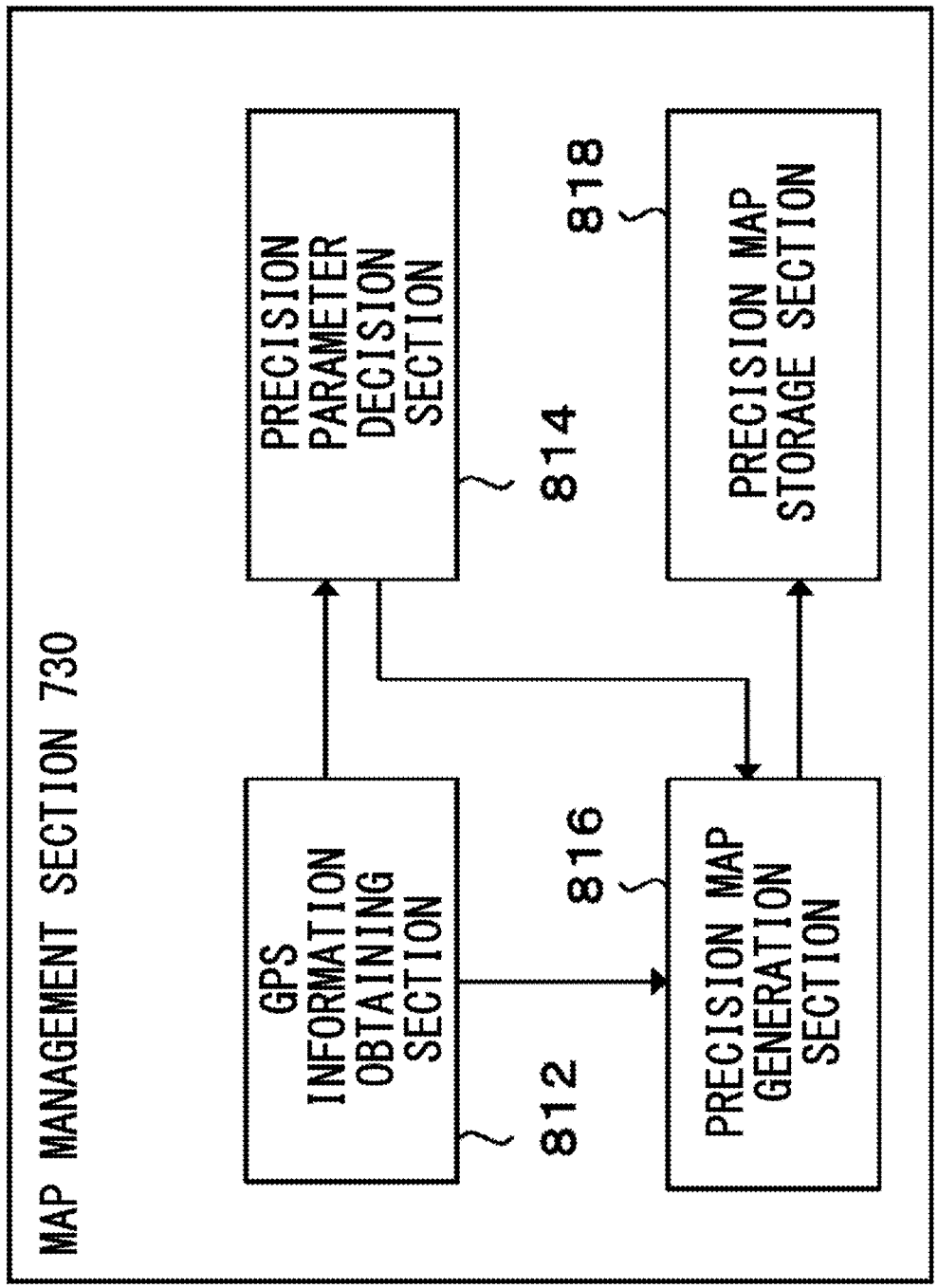
FIG. 8 schematically illustrates one example of an internal configuration of a map management section 730.

FIG. 8 schematically illustrates one example of an internal configuration of the map management section 730. According to the present embodiment, the map management section 730 includes a GPS information obtaining section 812, a precision parameter decision section 814, a precision map generation section 816, and a precision map storage section 818. The GPS information obtaining section 812 may be one example of the precision information obtaining section. The precision map generation section 816 may be one example of a map information generation section.

According to the present embodiment, the GPS information obtaining section 812 obtains the GPS information of the lawn mower 210 which is output by the GPS signal reception section 360 from the lawn mower 210 via the communication network 20. For example, the lawn mower 210 transmits the GPS information output by the GPS signal reception section 360 to the management server 230 while moving inside the work region 202. Thus, with regard to at least a part of the plurality of sub areas 204 constituting the work region 202, the map management section 730 can obtain the precision information indicating the positioning precision of the positioning based on the GPS signal 12 received inside the above-described sub area.

The GPS information obtaining section 812 may also control the lawn mower 210 and cause the lawn mower 210 to move to a region where the GPS information is not obtained. For example, with regard to at least each of the plurality of sub areas 204 constituting the region set as the application target of the location estimation processing using the precision parameter, the map management section 730 can obtain the precision information indicating the positioning precision of the positioning based on the GPS signal 12 received inside the above-described sub area. With regard to each of the plurality of sub areas 204 constituting the work region 202, the map management section 730 may also obtain the precision information indicating the positioning precision of the positioning based on the GPS signal 12 received inside the above-described sub area.

The GPS information obtaining section 812 transmits the GPS information from the lawn mower 210 to the precision parameter decision section 814. The GPS information obtaining section 812 may also transmit the GPS information from the lawn mower 210 to the precision map generation section 816.

According to the present embodiment, the precision parameter decision section 814 decides the precision parameter in each of the plurality of sub areas 204 included in the work region 202 based on the precision information included in the GPS information obtained by the GPS information obtaining section 812. As described above, the decision method and the format of the precision parameter are not particularly limited.

The precision parameter decision section 814 may also decide the precision parameter of the sub area based on one or more pieces of the GPS information associated with each sub area. As the GPS information associated with the sub area 204, (i) the GPS information where at least a part of the regions indicated by the GPS information (for example, the region 514) is included in the sub area, (ii) the GPS information where all the regions indicated by the GPS information (for example, the region 514) are included in the sub area, and the like are exemplified.

According to one embodiment, the precision parameter decision section 814 decides the precision parameter of the sub area 204 set as the target of the decision processing by performing the n-grade evaluation (n is an integer of two or higher) of the positioning precision indicated by each of one or more pieces of the GPS information associated with the sub area 204 which is set as the target of processing for deciding the precision parameter (which may be referred to as decision processing in some cases) or the statistic value thereof. According to another embodiment, the precision parameter decision section 814 may also decide the precision parameter of the sub area 204 set as the target of the decision processing by inputting the positioning precision indicated by each of one or more pieces of the GPS information associated with the sub area 204 set as the target of the decision processing or the statistic value thereof to the above-described evaluation function. According to still another embodiment, the precision parameter decision section 814 may also decide the precision parameter of the sub area 204 set as the target of the decision processing by inputting the positioning precision indicated by each of one or more pieces of the GPS information associated with the sub area 204 set as the target of the decision processing or the statistic value thereof to the above-described learning machine.

According to the present embodiment, the precision map generation section 816 generates the map information. For example, the precision map generation section 816 associates and stores the precision parameter of each sub area decided by the precision parameter decision section 814 and the area identification information of each sub area in the precision map storage section 818. According to the present embodiment, the precision map generation section 816 stores the precision map generated by the precision map generation section 816.

FIG. 9 schematically illustrates one example of a data table 900. The data table 900 may be one example of the evaluation criteria used when the precision map generation section 816 generates the map information based on the n-grade evaluation. According to the present embodiment, the data table 900 associates and stores a classification 912 for identifying each of the plurality of precision parameters and a condition 914 related to the positioning precision in the sub area 204 belonging to each classification or the statistic value thereof.

According to the present embodiment, the condition 914 includes a condition related to each of an average value, a maximum value, and a deviation of the positioning precisions in the sub areas 204 set as the evaluation targets. A plurality of conditions included in the condition 914 may also be AND conditions, or may also be OR conditions.

While the embodiments of the present invention have been described, the technical scope of the invention is not limited to the above described embodiments. It is apparent to persons skilled in the art that various alterations and improvements can be added to the above-described embodiments. In addition, as long as a technical contradiction is not made, the item described with regard to the particular embodiment can be applied to other embodiments. For example, the item described with regard to the embodiment of FIG. 1 can be applied to other embodiments described in association with other drawings. It is also apparent from the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described using phrases such as "first" or "next" in the claims, embodiments, or diagrams, it does not necessarily mean that the process must be performed in this order.

EXPLANATION OF REFERENCES

10 positioning signal, 12 GPS signal, 20 communication network, 22 user terminal, 102 target region, 104 sub area, 110 moving object, 130 positioning signal reception section, 140 precision map storage section, 150 location estimation apparatus, 162 positioning information obtaining section, 164 sub area extraction section, 166 precision parameter extraction section, 168 comparison section, 170 output section, 200 management system, 202 work region, 204 sub area, 210 lawn mower, 220 charging station, 230 management server, 302 enclosure, 312 front wheel, 314 rear wheel, 316 travel motor, 320 work unit, 322 blade disk, 324 cutter blade, 326 work motor, 328 shaft, 330 location adjustment section, 340 battery unit, 350 user interface, 360 GPS signal reception section, 370 sensor unit, 380 control unit, 410 communication control section, 420 travel control section, 430 work unit control section, 440 input and output control section, 510 data, 512 location, 514 region, 520 data, 530 comparison result, 630 estimated location, 710 communication control section, 720 request processing section, 730 map management section, 740 equipment management section, 750 work plan management section, 812 GPS information obtaining section, 814 precision parameter decision section, 816 precision map generation section, 818 precision map storage section, 900 data table, 912 classification, 914 condition

What is claimed is:

1. A computer-implemented location estimation system, including a computer processor, comprising:
    a positioning information obtaining section, executed by the processor, configured to obtain positioning information including precision information indicating a positioning precision from a GPS receiver mounted to a moving object and configured to receive a positioning signal;
    a sub area extraction section, executed by the processor, configured to extract, in a case where the positioning precision indicated by the precision information included in the positioning information that is obtained by the positioning information obtaining section satisfies a predetermined condition, among a plurality of sub areas included in a target region having a predetermined geographical range, one or more sub areas including at least a part of a region defined by a location and an error range indicated by the positioning information obtained by the positioning information obtaining section;
    a precision parameter extraction section, executed by the processor, configured to refer to map information in which area identification information for identifying each of the plurality of sub areas is associated with a precision parameter indicating a positioning precision of positioning using the positioning signal corresponding to a positioning precision in the respective sub area of the plurality of sub areas, and extract, with regard to each of the one or more sub areas extracted by the sub area extraction section, the precision parameter associated with the area identification information of the respective sub area of the one or more sub areas;
    a comparison section, executed by the processor, configured to compare, with regard to each of the one or more sub areas extracted by the sub area extraction section, the positioning precision indicated by the precision parameter extracted by the precision parameter extraction section with the positioning precision indicated by the precision information included in the positioning information obtained by the positioning information obtaining section; and
    an output section, executed by the processor, configured to output, based on a comparison result of the comparison section, among the one or more sub areas extracted by the sub area extraction section, a sub area where the positioning precision indicated by the precision parameter extracted by the precision parameter extraction section is equal to or worse than the positioning precision indicated by the precision information included in the positioning information that is obtained by the positioning information obtaining section, as a location of the moving object.

2. A moving object comprising:
    the location estimation system according to claim 1; and the GPS receiver.

3. The computer-implemented location estimation system according to claim 1, wherein
    the output section outputs, based on the comparison result of the comparison section among the one or more sub areas extracted by the sub area extraction section the sub area where the positioning precision indicated by the precision parameter extracted by the precision parameter extraction section is equal to the positioning precision indicated by the precision information included in the positioning information that is obtained by the positioning information obtaining section, as the location of the moving object.

4. A moving object comprising:
    the location estimation system according to claim 3; and the GPS receiver.

5. The computer-implemented location estimation system according to claim 1, wherein the output section outputs,
    in a case where the positioning precision indicated by the precision information
    included in the positioning information that is obtained by the positioning information obtaining section does not satisfy the predetermined condition, the region defined by the location and the error range indicated by the positioning information that is obtained by the positioning information obtaining section, as the location of the moving object.

6. A moving object comprising:
    the location estimation system according to claim 5; and the GPS receiver.

7. The computer-implemented location estimation system according to claim 1, further comprising:
    a precision information obtaining section, executed by the processor, configured to obtain with regard to each of the plurality of sub areas, the precision information indicating the positioning precision of the positioning based on the positioning signal received inside the sub area;
    a precision parameter decision section, executed by the processor, configured to decide the precision parameter of each sub area based on the precision information obtained by the precision information obtaining section; and
    a map information generation section, executed by the processor, configured to generate the map information by associating the precision parameter of each sub area decided by the precision parameter decision section with the area identification information of each sub area.

8. A moving object comprising:
    the location estimation system according to claim 7; and the GPS receiver.

9. A non-transitory computer readable storage medium that stores a program, the program causing a computer to execute:
    a positioning information obtaining step to obtain positioning information including precision information indicating a positioning precision from a positioning signal reception section mounted to a moving object and configured to receive a positioning signal;
    a sub area extraction step to extract, in a case where the positioning precision indicated by the precision information included in the positioning information that is obtained in the positioning information obtaining step satisfies a predetermined condition, among a plurality of sub areas included in a target region having a predetermined geographical range, one or more sub areas including at least a part of a region defined by a location and an error range indicated by the positioning information that is obtained in the positioning information obtaining step;

a precision parameter extraction step to refer to map information in which area identification information for identifying each of the plurality of sub areas is associated with a precision parameter indicating a positioning precision of positioning using the positioning signal corresponding to a positioning precision in the respective sub area of the plurality of sub areas, and extract, with regard to each of the one or more sub areas extracted in the sub area extraction step, the precision parameter associated with the area identification information of the respective sub area of the one or more sub areas;

a comparison step to compare with regard to each of the one or more sub areas extracted in the sub area extraction step, the positioning precision indicated by the precision parameter that is extracted in the precision parameter extraction step with the positioning precision indicated by the precision information included in the positioning information that is obtained in the positioning information obtaining step; and an output step to output, based on a comparison result in the comparison step among the one or more sub areas extracted in the sub area extraction step a sub area where the positioning precision indicated by the precision parameter extracted in the precision parameter extraction step is equal to or worse than the positioning precision indicated by the precision information included in information that is obtained in the positioning information obtaining step as a location of the moving object.

10. A location estimation method comprising:

a positioning information obtaining step to obtain positioning information including precision information indicating a positioning precision from a positioning signal reception section mounted to a moving object and configured to receive a positioning signal;

a sub area extraction step to extract, responsive to the positioning precision indicated by the precision information included in the positioning information that is obtained in the positioning information obtaining step satisfying a predetermined condition, among a plurality of sub areas included in a target region having a predetermined geographical range, one or more sub areas including at least a part of a region defined by a location and an error range indicated by the positioning information that is obtained in the positioning information obtaining step;

a precision parameter extraction step to refer to map information in which area identification information for identifying each of the plurality of sub areas is associated with a precision parameter indicating a positioning precision of positioning using the positioning signal corresponding to a positioning precision in the respective sub area of the plurality of sub areas, and extract, with regard to each of the one or more sub areas extracted in the sub area extraction step, the precision parameter associated with the area identification information of the respective sub area of the one or more sub areas;

a precision information obtaining step to obtain, with regard to each of the plurality of sub areas, the precision information indicating the positioning precision of the positioning based on the positioning signal received inside the sub area;

a precision parameter decision step to decide the precision parameter of each sub area based on the precision information obtained in the precision information obtaining step;

a map information generation step to generate the map information by associating the precision parameter of each sub area decided in the precision parameter decision step with the area identification information of each sub area;

a comparison step to compare with regard to each of the one or more sub areas extracted in the sub area extraction step, the positioning precision indicated by the precision parameter that is extracted in the precision parameter extraction step with the positioning precision indicated by the precision information included in the positioning information that is obtained in the positioning information obtaining step; and an output step to output, based on a comparison result in the comparison step, among the one or more sub areas extracted in the sub area extraction step a sub area where the positioning precision indicated by the precision parameter extracted in the precision parameter extraction step is equal to or worse than the positioning precision indicated by the precision information included in the positioning information that is obtained in the positioning information obtaining step, as a location of the moving object.

* * * * *